(12) United States Patent
McLeod et al.

(10) Patent No.: US 12,475,578 B2
(45) Date of Patent: Nov. 18, 2025

(54) SYSTEMS AND METHODS FOR REGISTERING VISUAL REPRESENTATIONS OF A SURGICAL SPACE

(71) Applicant: Intuitive Surgical Operations, Inc., Sunnyvale, CA (US)

(72) Inventors: A. Jonathan McLeod, Sunnyvale, CA (US); Maximilian H. Allan, San Francisco, CA (US); Mahdi Azizian, San Jose, CA (US); Daniel Proksch, San Jose, CA (US); Pourya Shirazian, Menlo Park, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 352 days.

(21) Appl. No.: 17/912,784

(22) PCT Filed: Mar. 19, 2021

(86) PCT No.: PCT/US2021/023294
§ 371 (c)(1),
(2) Date: Sep. 19, 2022

(87) PCT Pub. No.: WO2021/194895
PCT Pub. Date: Sep. 30, 2021

(65) Prior Publication Data
US 2023/0145531 A1 May 11, 2023

Related U.S. Application Data

(60) Provisional application No. 62/993,587, filed on Mar. 23, 2020.

(51) Int. Cl.
*G06T 7/33* (2017.01)

(52) U.S. Cl.
CPC ...... *G06T 7/33* (2017.01); *G06T 2207/10068* (2013.01); *G06T 2207/30004* (2013.01)

(58) Field of Classification Search
CPC ............ G06T 7/33; G06T 2207/10068; G06T 2207/30004
(Continued)

(56) References Cited

U.S. PATENT DOCUMENTS 5,999,840 A 12/1999 Grimson et al.
11,065,079 B2 * 7/2021 Wolf ................. G06V 20/20
(Continued)

FOREIGN PATENT DOCUMENTS

CN 104000655 A 8/2014
WO WO-2016092408 A1 6/2016

OTHER PUBLICATIONS

International Preliminary Report on Patentability for Application No. PCT/US2021/023294, mailed Oct. 6, 2022, 10 pages.
(Continued)

*Primary Examiner* — Helen Zong

(57) ABSTRACT

An exemplary image management system accesses semantic information regarding an anatomical object in a surgical space and registers, based at least in part on the semantic information regarding the anatomical object, a first dataset of a first visual representation of the surgical space with a second dataset of a second visual representation of the surgical space.

20 Claims, 11 Drawing Sheets

(58) Field of Classification Search
USPC .......................................................... 382/128
See application file for complete search history.

(56) References Cited

U.S. PATENT DOCUMENTS

| | | | |
|---|---|---|---|
| 11,175,664 B1* | 11/2021 | Boyraz | G05D 1/0278 |
| 2008/0298656 A1 | 12/2008 | Yim et al. | |
| 2010/0098305 A1* | 4/2010 | Burns | G06T 7/33 |
| | | | 382/128 |
| 2012/0016269 A1 | 1/2012 | Moctezuma De La Barrera | |
| 2018/0174311 A1* | 6/2018 | Kluckner | G06V 10/25 |
| 2021/0378748 A1* | 12/2021 | Leist | A61B 34/30 |
| 2022/0414914 A1* | 12/2022 | Shirazian | G06T 7/593 |
| 2023/0402164 A1* | 12/2023 | Bhardwaj | G16H 50/20 |
| 2023/0419655 A1* | 12/2023 | Gudavalli | G06F 16/29 |

OTHER PUBLICATIONS

Alper Y., et al., "Object tracking", ACM Computing Surveys, Dec. 2006, vol. 38 (4), pp. 1-45.
International Search Report and Written Opinion for Application No. PCT/US2021/023294, mailed Jun. 11, 2021, 13 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
Wu X., et al., "Quantifying Anatomic Deformations During Laryngoscopy," Annals of Biomedical Engineering, Mar. 2018, vol. 46 (6), pp. 912-925.

* cited by examiner

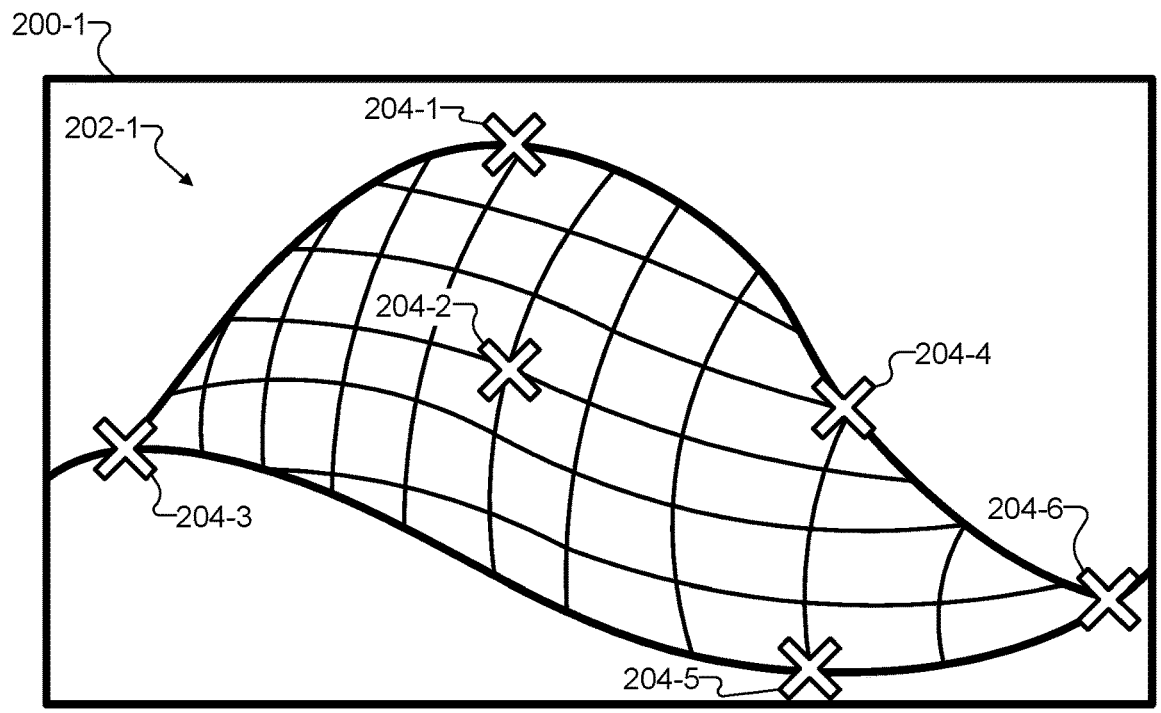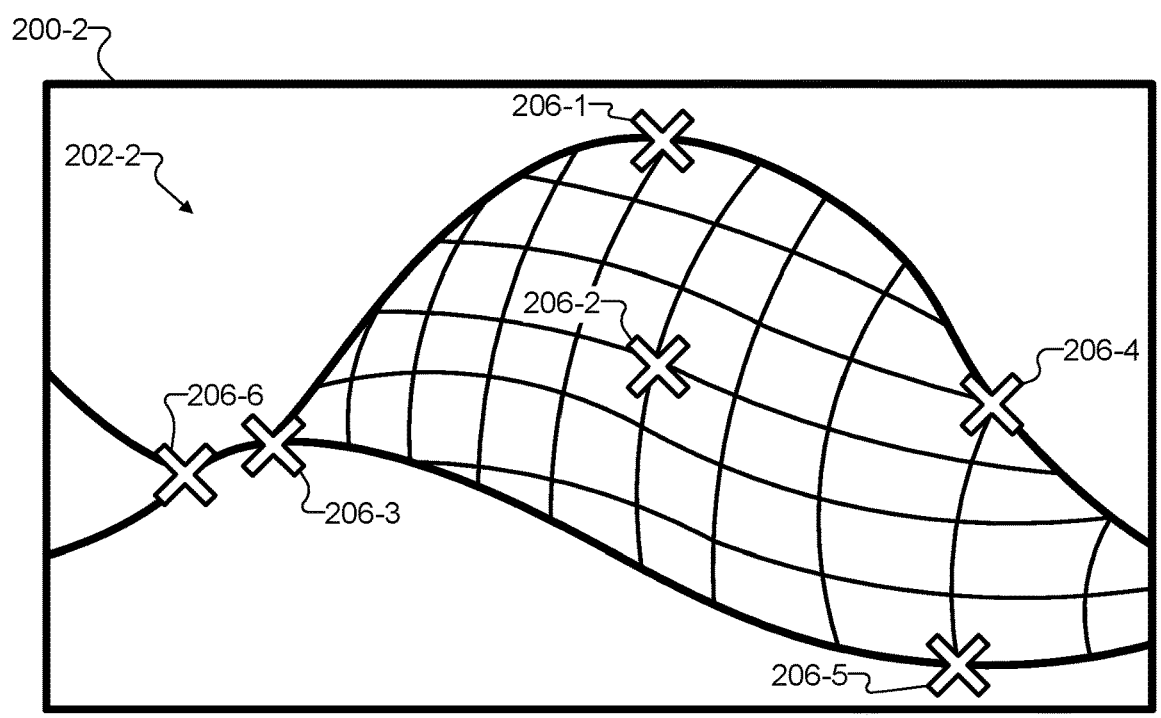
Fig. 2

SYSTEMS AND METHODS FOR REGISTERING VISUAL REPRESENTATIONS OF A SURGICAL SPACE

RELATED APPLICATIONS

The present application is a U.S. National Stage Application under 35 U.S.C. § 371 of International Application No. PCT/US2021/023294, filed on Mar. 19, 2021, which claims priority to U.S. Provisional Patent Application No. 62/993,587, filed Mar. 23, 2020, the contents of which are hereby incorporated by reference in their entirety.

BACKGROUND INFORMATION

During a surgical procedure, various visual representations of a surgical space may be generated. For example, an endoscope may be used to capture endoscopic imagery of a surgical site. The endoscopic imagery may be presented to a surgeon by way of a display device so that the surgeon may visualize the surgical site while performing the surgical procedure.

In some scenarios, one or more imaging modalities may be used to capture additional visual representations of the surgical site that may also be presented to the surgeon. Such additional visual representations may be captured preoperatively or intraoperatively, and may be captured, for instance, by way of an ultrasound scan, a computerized tomography ("CT") scan, a magnetic resonance imaging ("MRI") scan, a fluoroscopic imaging scan, and/or another suitable imaging modality configured to capture imagery of the surgical site.

To synthesize various imaging modalities and to provide intuitive visualizations, it may be useful to register the various visual representations of the surgical space. Such registration, however, may not always be a straightforward process.

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An exemplary system includes a memory storing instructions and a processor communicatively coupled to the memory and configured to execute the instructions to access semantic information regarding an anatomical object in a surgical space; and register, based at least in part on the semantic information regarding the anatomical object, a first dataset of a first visual representation of the surgical space with a second dataset of a second visual representation of the surgical space.

An exemplary method includes a processor (e.g., a processor of an image management system) accessing scene segmentation information for a first visual representation of a surgical space including an anatomical object and a second visual representation of the surgical space; determining based on the scene segmentation information, a set of reliable tissues for registering a first dataset of the first visual representation with a second dataset of the second visual representation; determining in an image of the first visual representation, first regions depicting one or more tissues of the set of reliable tissues; determining in the image of the first visual representation, a first plurality of feature points in the first regions depicting the one or more tissues; determining in an image of the second visual representation, second regions depicting the one or more tissues; determining in the image of the second visual representation, a second plurality of feature points in the second regions depicting the one or more tissues; and registering based at least in part on an alignment of the first plurality of feature points with the second plurality of feature points, the first dataset of the first visual representation and the second dataset of the second visual representation.

Another exemplary method includes a processor (e.g., a processor of an image management system) accessing information regarding a current phase of a procedure performed on an anatomical object in a surgical space; and selectively updating based on the current phase of the procedure, an initial registration of a dataset of a first visual representation of the surgical space with a dataset of a second visual representation of the surgical space.

Another exemplary method includes a processor (e.g., a process of an image management system) accessing force sensing data of a computer-assisted surgical system performing a procedure on an anatomical object om a surgical space; detecting an interaction with the anatomical object in a first dataset of a first visual representation of the surgical space; modeling based on the force sensing data, the interaction in a second dataset of a second visual representation of the surgical space; and registering the first dataset of the first visual representation with the second dataset of the second visual representation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 illustrates exemplary images for an image management system to register according to principles described herein.

DETAILED DESCRIPTION

Figure 1:
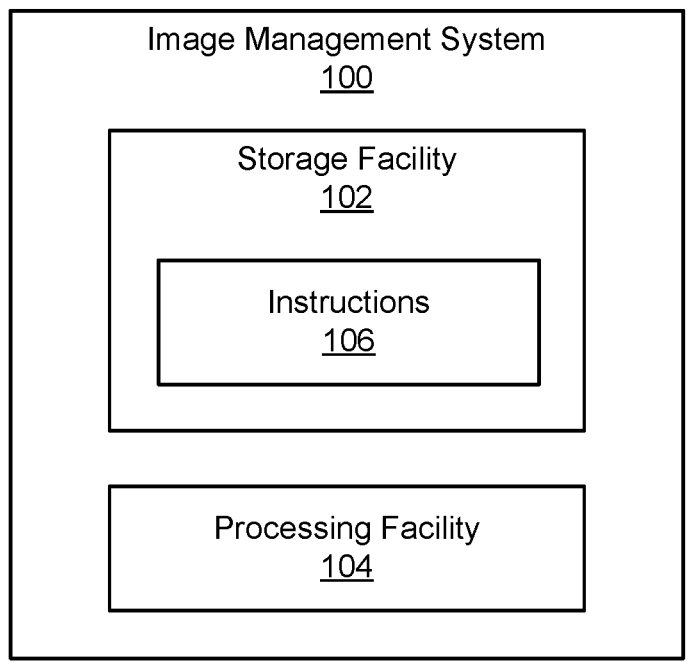
FIG. 1 illustrates an exemplary image management system for managing imaging data according to principles described herein.

Systems and methods for registering datasets of visual representations of a surgical space and tracking an anatomical object in the surgical space are described herein. Various types of surgical procedures may be planned or performed in a surgical space that may include an anatomical object of a body upon which the surgical procedure is performed (or is to be performed), anatomy proximate to the anatomical object being (or that is to be) operated on, and other areas (e.g., open space) proximate to the anatomical object. The surgical space may be imaged and/or modeled using various imaging modalities, such as an endoscope, an ultrasound scan, preoperative imaging scans, etc. Imaging may generate various visual representations of the surgical space, such as a video of one or more surgical scenes that depict the surgical space, a model of the surgical space, etc. A visual representation of a surgical space may include or be represented with any data, in any suitable format, that represents at least a portion of the surgical space and that may be used to provide a visual presentation of at least a portion of the surgical space. In certain examples, the data may be obtained from imaging the surgical space with one or more imaging modalities. The data may represent the surgical space in any suitable way, such as two-dimensional imagery, three-dimensional imagery, four-dimensional imagery (three-dimensional imagery with a time component), color imagery, depth data, texture data, etc. In certain examples, a visual representation may include data representing a model of the surgical space, such as a 3D model of the surgical space. Data representing a visual representation or a portion of a visual representation of a surgical space may be referred to as a dataset of the visual representation. Such dataset may be in any suitable formats, such as video datasets representing video of the surgical space, model datasets representing models (e.g., two-dimensional models or three-dimensional models) of the surgical space, or any other datasets suitable for representing the surgical space. An image management system may perform various operations to register datasets of the various visual representations (e.g., identify, match, or align corresponding data points of datasets). For example, the image management system may receive semantic information regarding the anatomical object, such as scene segmentation information, procedure phase information, and/or force sensing information from surgical instruments. The image management system may use the semantic information to accurately register datasets of the visual representations.

Systems and methods described herein may provide various advantages and benefits. For example, accurately registering datasets of visual representations of a surgical space may enable an image management system to generate accurate composite images using multiple imaging modalities and/or models of the anatomical objects. Further, reliable registration of datasets of visual representations of the surgical space may facilitate the image management system accurately tracking an anatomical object in the surgical space. Such accurate images and tracking of the anatomical object may provide information to the surgeon that may be valuable in performing surgical procedures more efficiently and/or effectively than without such information.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary image management system 100 ("system 100") for registering datasets of visual representations of a surgical space. System 100 may be included in, implemented by, or connected to one or more components of a computer-assisted surgical system such as an exemplary computer-assisted surgical system that will be described below in relation to FIG. 6. For example, system 100 may be implemented by one or more components of a computer-assisted surgical system such as a manipulating system, a user control system, or an auxiliary system. As another example, system 100 may be implemented by a stand-alone computing system communicatively coupled to a computer-assisted surgical system.

As shown in FIG. 1, system 100 may include, without limitation, a storage facility 102 and a processing facility 104 selectively and communicatively coupled to one another. Facilities 102 and 104 may each include or be implemented by one or more physical computing devices including hardware and/or software components such as processors, memories, storage drives, communication interfaces, instructions stored in memory for execution by the processors, and so forth. Although facilities 102 and 104 are shown to be separate facilities in FIG. 1, facilities 102 and 104 may be combined into fewer facilities, such as into a single facility, or divided into more facilities as may serve a particular implementation. In some examples, each of facilities 102 and 104 may be distributed between multiple devices and/or multiple locations as may serve a particular implementation.

Storage facility 102 may maintain (e.g., store) executable data used by processing facility 104 to perform any of the functionality described herein. For example, storage facility 102 may store instructions 106 that may be executed by processing facility 104 to perform one or more of the operations described herein. Instructions 106 may be implemented by any suitable application, software, code, and/or other executable data instance. Storage facility 102 may also maintain any data received, generated, managed, used, and/or transmitted by processing facility 104.

Processing facility 104 may be configured to perform (e.g., execute instructions 106 stored in storage facility 102 to perform) various operations associated with registering datasets of visual representations of a surgical space. For example, processing facility 104 may be configured to access a first dataset of a first visual representation of the surgical space including an anatomical object and a second dataset of a second visual representation of the surgical space. Processing facility 104 may further access semantic information regarding the anatomical object. Processing facility 104 may further register, based at least in part on the semantic information regarding the anatomical object, the first dataset of the first visual representation of the surgical space with the second dataset of the second visual representation of the surgical space.

These and other operations that may be performed by system 100 (e.g., processing facility 104) are described herein. In the description that follows, any references to functions performed by system 100 may be understood to be performed by processing facility 104 based on instructions 106 stored in storage facility 102.

FIG. 2 illustrates exemplary aspects of a registration of a first set of imaging data 200-1 with a second set of imaging data 200-2. The registration of first imaging data with second imaging data may refer, in certain examples, to a mapping of image datapoints from the first imaging data to corresponding image datapoints in the second imaging data, such that the registration allows for the image datasets to be aligned from a particular viewpoint. For example, as illustrated in FIG. 2, imaging data 200-1 is representative of a depiction 202-1 of an anatomical object (e.g., an internal organ or portion thereof, etc.) in a surgical space. Imaging data 200-2 is representative of a depiction 202-2 of the same anatomical object (albeit captured from a slightly different viewpoint such that imaging data 200-1 and 200-2 are similar but not identical). The registration of imaging data 200-1 with imaging data 200-2 may involve determining whether various features 204 (e.g., features 204-1 through 204-6) in depiction 202-1 correspond to like features 206 (e.g., features 206-1 through 206-6) in depiction 202-2.

As shown, for example, features 204-1 and 206-1 may be determined to be a match (i.e., representative of the same physical features), as may the feature pairs 204-2 and 206-2, 204-3 and 206-3, 204-4 and 206-4, and 204-5 and 206-5. In this example, a feature of each depiction is also called out that does not correspond to a like feature in the other depiction. Specifically, no datapoint in depiction 202-2 of imaging data 200-2 may correspond to the datapoint representing feature 204-6 in depiction 202-1 of imaging data 200-1, nor may any datapoint in depiction 202-1 correspond to the datapoint representing feature 206-6 in depiction 202-2. Imaging data 200-1 may be registered with imaging data 200-2 by identifying a sufficient number of corresponding datapoint pairs (e.g., datapoint pairs representative of like features 204 and 206) that depiction 202-1 can be aligned with depiction 202-2 with respect to a particular viewpoint (e.g., either the viewpoint from which imaging data 200-1 was captured, the viewpoint from which imaging data 200-2 was captured, or another suitable viewpoint).

In the example of FIG. 2, depictions 202-1 and 202-2 may look similar because the respective images of each imaging data 200-1 and 200-2 may be from a single visual representation, captured by way of the same imaging modality (e.g., in the same manner, by the same capture device, using the same imaging technology, etc.). Additionally, and because of the visual similarities, registering imaging data 200-1 with imaging data 200-2 may be performed in a relatively straightforward way by identifying features 204 in depiction 202-1, identifying features 206 in depiction 202-2, and matching features from each group to identify corresponding datapoints.

However, while the example of FIG. 2 illustrates aspects of registering imaging data captured by a single imaging modality, in certain examples, it may be desirable to register imaging data from a plurality of visual representations. For instance, a dataset of a first visual representation may include imaging data from a first imaging modality (e.g., an endoscopic imaging modality) while a dataset of a second visual representation may include imaging data from a second imaging modality (e.g., an additional imaging modality such as a CT scan, an MRI scan, or the like) and/or from different points in time from the first (or second) imaging modality.

As one example, different imaging modalities may capture depictions or other representations of anatomy at different points in time. For instance, an endoscopic imaging modality may comprise an intraoperative scan of anatomy in a surgical space, and, as such may be performed in real-time as an operation is ongoing. Similarly, an ultrasound scan or a fluoroscopic imaging scan (in which a fluorescent dye is injected into the body to facilitate imaging at specific frequencies at which the dye exhibits fluorescent properties) may similarly be employed intraoperatively, either in real time as the operation is being performed or during the operation period while active surgical operations are temporarily put on hold while the imaging is performed. Conversely, other types of imaging modalities may capture depictions or other representations of anatomy at some point in time prior to an operation being performed in the surgical space (e.g., immediately prior, a day or more prior, etc.). For example, an imaging modality comprising a CT scan, an MRI scan, an ultrasound scan, an x-ray scan, a 3D modeling generation based on data from any such scans, or another other suitable imaging modality may be performed at a different time when the body is in a different state. For example, a patient upon which the surgical operation is performed may be positioned differently (e.g., laying on the back versus laying on the side), or may have other significant differences (e.g., fasting or not fasting) during a preoperative time when one imaging modality is used and during an intraoperative time when another imaging modality is used. As another example, images from different points in time from one imaging modality may be used to track movement of an anatomical object in a surgical space. In other examples, different modalities may be used at the same time (e.g., both preoperatively, both intraoperatively, etc.) or at times that are different in other ways than this example (e.g., different preoperative times, different intraoperative times, a preoperative and a postoperative time, an intraoperative and a postoperative time, etc.).

There may be various purposes for which system 100 registers datasets of multiple visual representations. For example, as has been mentioned, one purpose of registering a first dataset of a first visual representation including first imaging data with a second dataset of a second visual representation including second imaging data is to align the first and second imaging data so as to allow system 100 to generate and provide a composite image of the surgical space, for display by a display device, that includes aspects of both the first imaging data and the second imaging data as viewed from a particular viewpoint (e.g., a viewpoint of a surgeon performing a surgical procedure in the surgical space, etc.). For example, such a composite image may be based on a registration of endoscopic imaging data from an endoscopic imaging modality with a second visual representation including additional imaging data from an additional imaging modality, and may allow for aspects of both the endoscopic and the additional imaging data to be presented to a user in a single convenient, customizable view to facilitate operations in the surgical space. Additionally or alternatively, the second dataset of the second visual representation may include other information such as a model of the surgical space, a depth map of the surgical space, or a graphical element (e.g., an annotation, a virtual object, etc.). Aligning such other information with the endoscopic imaging data may also allow for intuitive, convenient, customizable views to facilitate operations in the surgical space. Additionally or alternatively, the second dataset of the second visual representation may be the endoscopic imaging data provided with a time offset, so that movement of anatomy depicted in the endoscopic imaging data may be tracked. Other purposes for registering datasets of visual representations are described herein.

Figure 3:
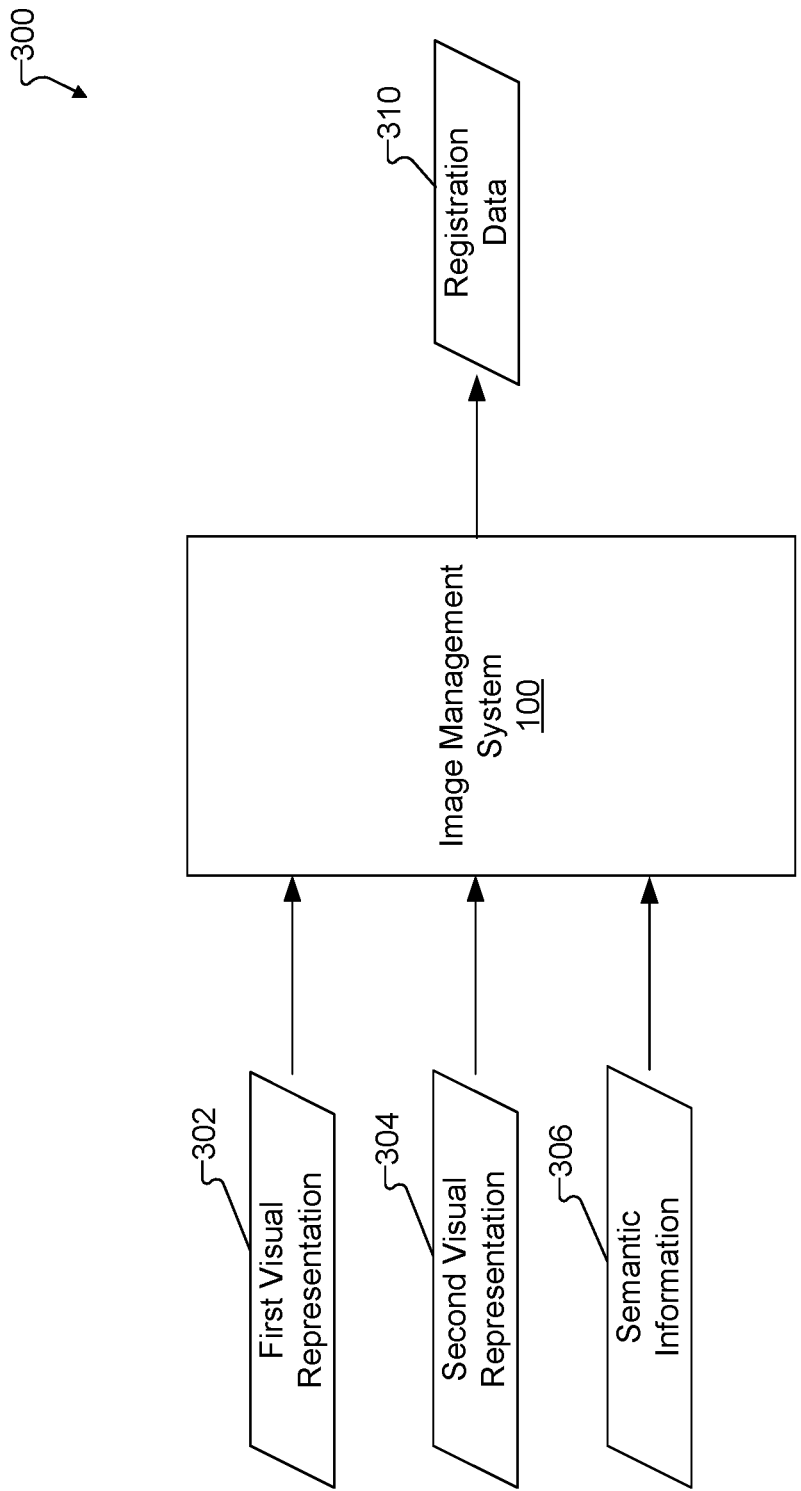
FIG. 3 illustrates an exemplary configuration of an image management system for managing imaging data according to principles described herein.

FIG. 3 illustrates an exemplary configuration 300 in which system 100 is configured to register datasets of visual representations of a surgical space. As shown, system 100 accesses (e.g., receives, generates, retrieves, etc.) a first dataset of a first visual representation 302 of a surgical space including an anatomical object on which a procedure is performed. System 100 also accesses a second dataset of a second visual representation 304 of the surgical space. System 100 further accesses semantic information 306 regarding the anatomical object. Based, at least in part on semantic information 306, system 100 provides registration data 310, which may be used to register the dataset of the first visual representation 302 and the dataset of the second visual representation 304.

First visual representation 302 may be any suitable visual representation of the surgical space. For example, first visual representation 302 may include video imagery provided by an imaging device such as an endoscope or other camera device configured to capture images of the surgical space. In some examples, the imaging device may be configured to be attached to and controlled by a computer-assisted surgical system. In alternative examples, the imaging device may be hand-held and operated manually by an operator (e.g. a surgeon). Additionally or alternatively, first visual representation 302 may include any examples described with respect to second visual representation 304. Any suitable dataset may represent first visual representation 302.

Second visual representation 304 may also be any suitable visual representation of the surgical space. For instance, second visual representation 304 may include imaging data other than video imagery, such as an ultrasound scan, a CT scan, an MRI scan, a fluoroscopic imaging scan, etc. of the anatomical object and/or the surgical space. Additionally or alternatively, second visual representation 304 may include a model of the anatomical object, such as a model generated using any such suitable scan imagery. Additionally or alternatively, second visual representation 304 may include a depth map of the surgical space and/or anatomical object that defines a distance between points in an image from a viewpoint. Additionally or alternatively, second visual representation 304 may include a graphical element, such as a virtual object, an annotation, a user interface component, etc. Additionally or alternatively, second visual representation 304 may include the imagery of first visual representation 302 with a time offset. For example, first visual representation 302 may include video imagery. Second visual representation 304 may include the same video imagery, offset by a certain amount of time and/or number of frames of the video imagery. By registering the time-offset video imagery, movement of objects within the video may be detected, which may correspond to movement of anatomy (such as the anatomical object) in the surgical space. Additionally or alternatively, second visual representation 304 may include imagery similar to first visual representation 302 but from a different viewpoint. For instance, two images of the surgical space from two viewpoints may provide information to generate a stereoscopic image of the surgical space and/or a depth map of the surgical space. While configuration 300 shows system 100 accessing a first and a second visual representation, any suitable number of visual representations may be registered using techniques described herein. Any suitable dataset may represent second visual representation 304.

Semantic information 306 may include any suitable information that provides meaning and/or context to imagery of visual representations of the surgical space. For example, semantic information 306 may include scene segmentation information (e.g., information indicating what is depicted in the imagery). Semantic information 306 may further include procedure phase information (e.g., information indicating a current phase of a surgical procedure on the anatomical object). As another example, semantic information 306 may include time information associated with imagery. Semantic information 306 may further include force sensing data (e.g., information indicating an amount of force sensed by a surgical instrument of a computer-assisted surgical system). Semantic information 306 may further include instrument tracking data (e.g., information indicating a pose of a surgical instrument of a computer-assisted surgical system). These and any other suitable exemplary different types of semantic information 306 may be used alone or in any suitable combination. System 100 may use semantic information 306 to aid in registering first visual representation 302 with second visual representation 304 in any suitable manner, such as described herein.

Registration data 310 may be any suitable data providing information to register a dataset of first visual representation 302 and a dataset of second visual representation 304. As described above, registration data 310 may include one or more feature pairs that are found to depict same features in imagery of first visual representation 302 and imagery of second visual representation 304. Additionally or alternatively, registration data 310 may include coordinate locations for imagery of first visual representation 302 and imagery of second visual representation 304 to align the visual representations. Additionally or alternatively, registration data 310 may include a type of registration to be performed, such as between two different imaging modalities versus between time-offset images of one imaging modality. In some examples, registration data 310 may include a command (or a flag or variable or any other suitable indicator) to refrain from registering datasets of first visual representation 302 and second visual representation 304 (e.g., during some phases of the procedure on the anatomical object, if scene segmentation information indicates that the anatomical object is not visible, etc.). Other examples of registration data 310 are described herein.

Figure 4:
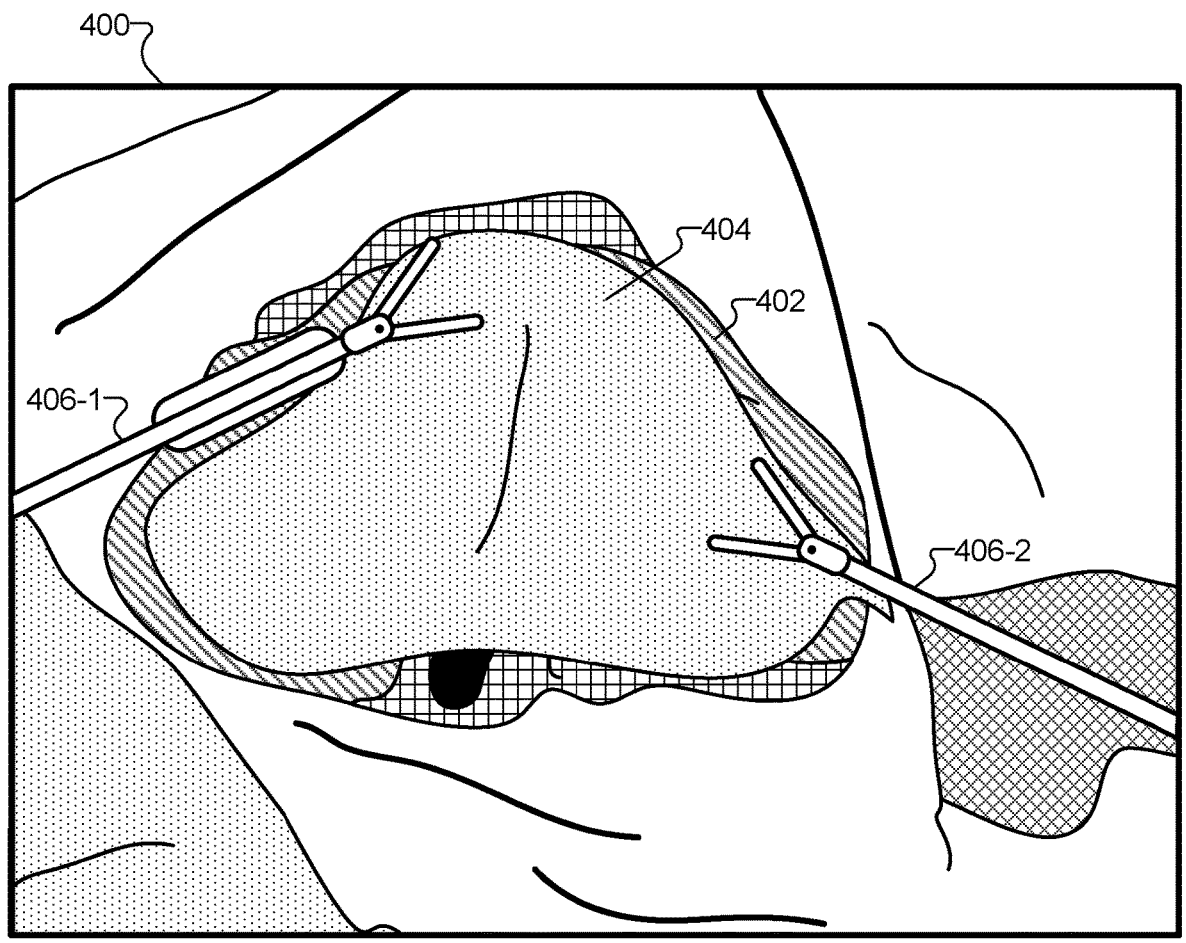
FIGS. 4-5 illustrate exemplary images for tracking anatomical objects according to principles described herein.

FIG. 4 shows an exemplary image 400 of a surgical space. Image 400 may be an image from a first visual representation of the surgical space, such as a frame of a video captured by an endoscope (or any suitable imaging device) that depicts the surgical space. Image 400 shows an anatomical object 402, which may be an organ on which a surgeon is performing a surgical procedure. As shown, anatomical object 402 is covered by a fat layer 404, as some organs may be found to have. Image 400 also shows surgical instruments 406 (e.g., surgical instrument 406-1 and 406-2), each of which may be implemented by any suitable therapeutic instrument (e.g., a tool having tissue-interaction functions), imaging device (e.g., an endoscope), diagnostic instrument, or the like that may be used for a computer-assisted surgical procedure on a patient (e.g., by being at least partially inserted into the patient and manipulated to perform a computer-assisted surgical procedure on the patient). Image 400 may be generated and/or accessed by an image management system (e.g., system 100).

System 100 may access an image from a second visual representation of the surgical space to register with image 400. System 100 may further access semantic information and base the registration, at least in part, on the semantic information.

For instance, semantic information may include scene segmentation information. Scene segmentation information for image 400 may indicate that pixel regions depicting anatomical object 402 correspond to anatomical object 402, pixel regions depicting fat layer 404 correspond to fat layer 404, other pixel regions correspond to background tissue, vasculature, bone, surgical instruments 406, etc. Scene segmentation information may further include descriptive information, such as multiple labels for anatomical object 402 that describe a state of anatomical object 402 (e.g., covered, uncovered, mobilized, etc.). In this manner, the scene segmentation information may indicate what it is that is being depicted in image 400.

System 100 may perform registration of image 400 with an image from a second visual representation in any suitable manner and based on any suitable information. For example, system 100 may determine, based on the scene segmentation information, tissues that may be considered reliable tissues on which to base registration of images and tissues that may be considered unreliable tissues on which to base registration. Reliability of tissue may be based on at least one characteristic of the tissue, such as a hardness of the tissue, a rigidity of the tissue, a mobility of the tissue, and a typical amount of movement of the tissue during a procedure on anatomical object 402, or any other suitable characteristic. For instance, tissues that typically move a lot during the procedure may not provide reliable feature points on which to register visual representations. Further, some tissues may be removed entirely during a procedure, such as fat layer 404. Basing registration of datasets of the visual representations on feature points on such tissues may also result in unreliable results. Thus, more rigid and/or relatively fixed tissues, such as bone, vasculature, or anatomical object 402 may provide more reliable feature points for registration. Additionally or alternatively, system 100 may use predefined lists of tissues that are classified as reliable or unreliable, or classified using a spectrum of reliability. An example predefined list of reliable tissues may include bone, vasculature, anatomical object 402, and any other suitable tissues predefined to be reliable. Such predefined lists may be configured to be customizable by a user.

System 100 may base the registration on the reliability of tissues in any suitable manner. For example, system 100 may identify, using the scene segmentation information, tissues in image 400 that correspond to reliable tissues and generate a binary mask over image 400, such that feature points are selected only on reliable tissues. Conversely, system 100 may identify tissues in image 400 that correspond to unreliable tissues and generate a similar binary mask and select feature points only on points other than the unreliable tissues. Additionally or alternatively, tissues may be classified on a spectrum of reliability and feature points on each tissue may be weighted accordingly. For instance, feature points selected on highly reliable tissue may be weighted highly, feature points selected on unreliable tissue weighted lowly or not at all, and other tissues may receive weights in between. System 100 may then use an algorithm using some weighted combination of the feature points to determine the registration. As an example, feature points found in one image that are not found with corresponding feature points in the other image may be more easily dismissed if the weighting of the feature points are lower. Using one or more of these techniques, system 100 may determine a plurality of reliable feature points on image 400 and perform a same or similar determination on an image from the second visual representation. System 100 may then register, based at least in part on an alignment of the plurality of reliable feature points in each image, datasets of the visual representations with each other.

System 100 may additionally or alternatively use scene segmentation information to align regions of imagery from visual representations to each other. For example, system 100 may use boundaries of objects (e.g., anatomical object 402, surgical instruments 406) identified in the scene segmentation information to register datasets of visual representations. Additionally or alternatively, system 100 may use the scene segmentation information with any suitable image processing techniques to register datasets of the visual representations. For instance, rather than (or in addition to) feature points, system 100 may use image-based registration, optimizing a similarity metric (e.g., mutual information, cross correlation, etc.), non-point features (e.g., edges, etc.) or any other suitable image processing technique.

Figure 5:
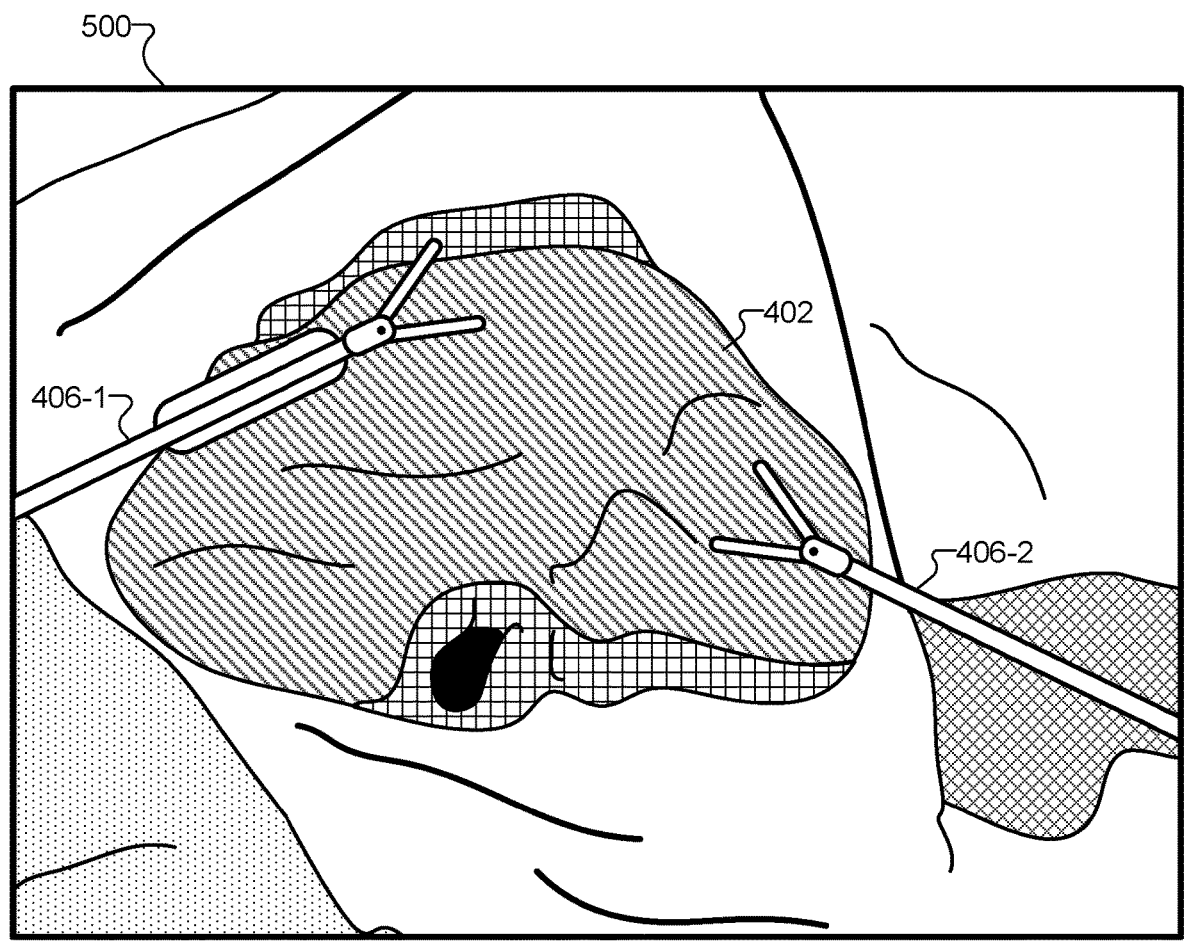

FIG. 5 shows an exemplary image 500 of the surgical space shown in image 400. Image 500 may be another image (e.g., a later image) from a first visual representation of the surgical space. Image 500 includes anatomical object 402 after fat layer 404 has been removed from the organ. Such removal of fat from the organ may be a typical step in a surgical procedure on the organ. As shown, removing fat layer 404 exposes much more of anatomical object 402 in imagery (e.g., image 500) depicting the surgical space. Such exposure may allow for more feature points on reliable tissue for registration of visual representations. Conversely, before fat layer 404 is removed, as shown in image 400, discarding feature points on fat layer 404 may also allow for more reliable registration of visual representations.

Further, by registering images from different points in time from a same imaging device and/or imaging modality, changes in the surgical space may be observed. For example, movement of anatomical object 402 may be tracked by registering a first visual representation of the surgical space with a second visual representation that is a time-offset stream of the first visual representation. For instance, the first visual representation may be a video of the surgical space including anatomical object 402. The second visual representation may be the same video with any suitable time offset (e.g., one second, a fraction of a second, a few frames of the video, etc.). By registering the video at time T with the video at time (T—offset), any movement of anatomical object 402 would be detected. By updating such a registration at a specified rate, movement of anatomical object 402 could be tracked. Thus, tracking of anatomical object 402 (or any other suitable anatomical objects) may be performed using any of the techniques described herein. For purposes of tracking anatomical object 402, feature points on anatomical object 402 may be discarded and/or weighted differently when registering the visual representations.

Furthermore, image 500 may depict a different phase of a surgical procedure than image 400. Such procedure phase information may be another example of semantic information accessed by system 100 on which to base registration of datasets of visual representations (e.g., image 500 with an image from a second visual representation). For instance, a phase of the procedure may determine whether registration should be updated from an initial registration. Such a determination may be based on an expected amount of change in the surgical space for the current procedure phase. If the surgical space changes significantly, a registration done previous to the significant change may no longer be accurate and/or more information may be available to more accurately register the visual representations. As shown in image 500, a removal of fat layer 404 may be an example instance where updating registration may be useful for either or both of these reasons.

Additionally or alternatively, in some phases of the procedure, registering datasets of the visual representations may not be worth a benefit of doing so, for instance if registering datasets of the visual representations will be more difficult (e.g., due to lack of reliable feature points, increased movement of anatomical object 402, the surgical space, and/or a viewpoint of an imaging device, etc.) or multiple visual representations will not provide particularly useful information. In such phases, system 100 may refrain from registering the visual representations.

Additionally or alternatively, in some phases of the procedure, system 100 may update the registration more or less frequently and/or use more or fewer feature points or any other differences of parameters. For example, if the procedure phase is one in which anatomical object 402 will be moving more than other phases and/or a more accurate registration or tracking is desired, the registration may be updated at a higher specified rate and/or using more feature points. Additionally or alternatively, the parameters that may be changed may include increasing or decreasing an amount of smoothing, increasing or decreasing a search space for the registration, switching a registration method (e.g., using image edges, depth map, and/or feature points, etc.) to support a higher or lower update rate, etc. Any other such suitable settings of parameters may be used based on the procedure phase information.

Further, system 100 may also access force sensing data and/or instrument tracking data (e.g., from surgical instruments 406) as another example of semantic information for basing registration of datasets of visual representations. Registration of datasets of visual representations and tracking of anatomical object 402 may be more difficult when anatomical object 402 is being manipulated (e.g., by surgical instruments 406). By accessing force sensing data and/or instrument tracking data to determine at which points and with how much force surgical instruments 406 are interacting with anatomical object 402, a model of anatomical object 402 (e.g., a second visual representation) may be modified to correspond to the manipulation of anatomical object 402 that may be depicted in a first visual representation (e.g., a video). For instance, the model of anatomical object 402 may be modified based on a rigidity of anatomical object 402. For a rigid anatomical object, the model may be modified by moving the model of anatomical object 402 a corresponding amount based on the force sensing data and/or instrument tracking data. For a less rigid anatomical object, the model may be modified by deforming as well as moving the model of anatomical object 402 corresponding amounts based on the rigidity of anatomical object 402 and force sensing data and/or instrument tracking data.

Figure 6:
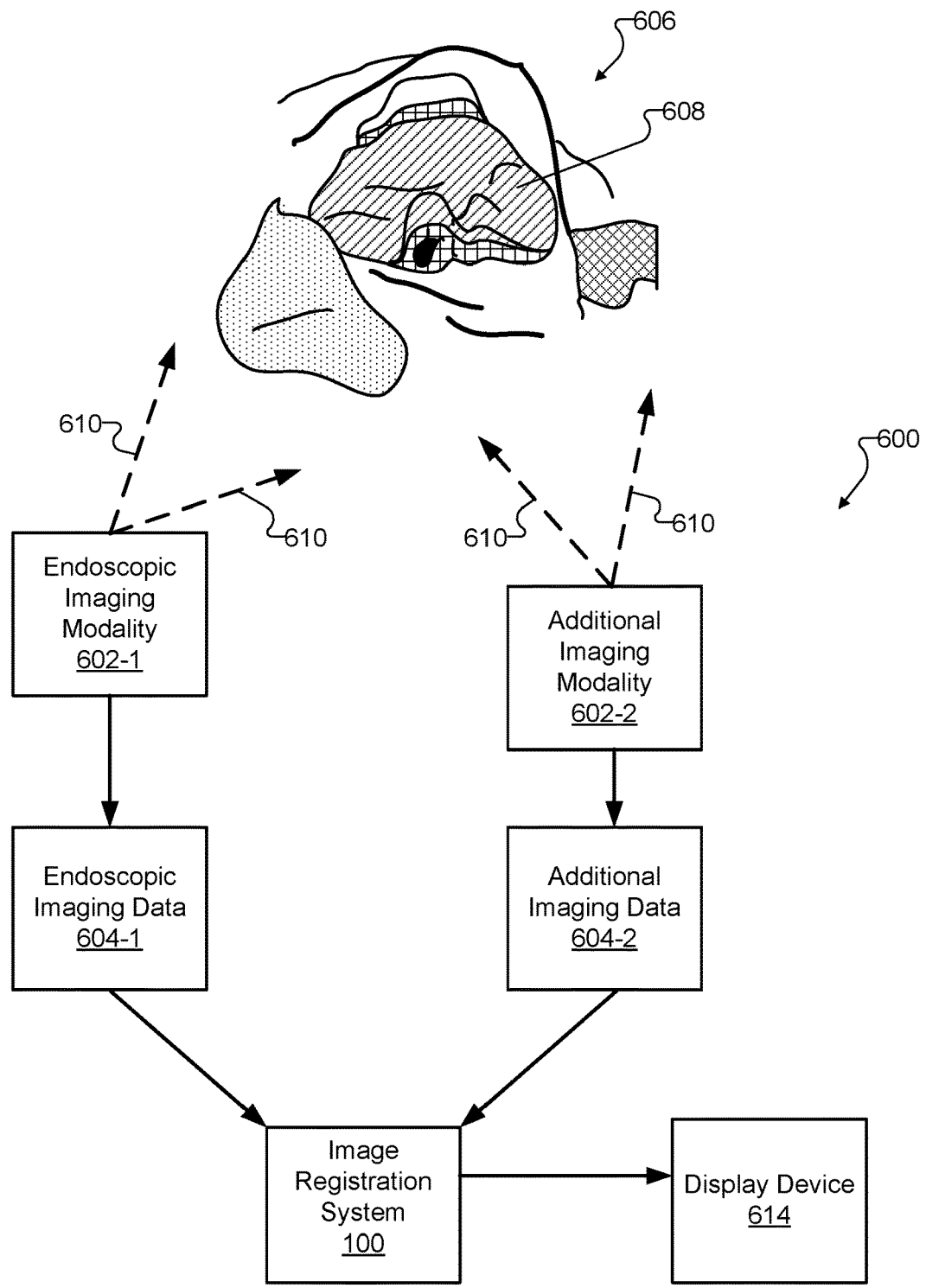
FIG. 6 illustrates an exemplary configuration in which the image management system of FIG. 1 registers imaging data from different imaging modalities according to principles described herein.

FIG. 6 shows an exemplary configuration 600 in which system 100 registers imaging data from a first and a second visual representation to generate composite imagery of a surgical space. As shown, configuration 600 may include multiple imaging modalities 602 (e.g., endoscopic imaging modality 602-1 and additional imaging modality 602-2) configured to capture imaging data 604 (e.g., endoscopic imaging data 604-1 captured by way of endoscopic imaging modality 602-1 and additional imaging data 604-2 captured by way of additional imaging modality 602-2) of a surgical space 606.

Surgical space 606 may include any volumetric space associated with a surgical procedure. For example, surgical space 606 may include any part or parts of a body of a patient, such as anatomy 608 (e.g., tissue, etc.) of the patient in a space associated with the surgical procedure. Surgical space 606 may, in certain examples, be entirely disposed within the patient and may include a space within the patient near where a surgical procedure is planned to be performed, is being performed, or has been performed. For example, for a minimally invasive surgical procedure being performed on tissue internal to a patient, surgical space 606 may include the surface tissue, anatomy underlying the surface tissue, as well as space around the tissue where, for example, surgical instruments being used to perform the surgical procedure are located. In other examples, surgical space 606 may be at least partially disposed external to the patient. For instance, for an open surgical procedure being performed on a patient, part of surgical space 606 (e.g., tissue being operated on) may be internal to the patient while another part of surgical space 606 (e.g., a space around the tissue where one or more surgical instruments may be disposed) may be external to the patient. Surgical space 606 may include a real workspace in which a surgical procedure is performed, such as an actual, real-world workspace associated with a patient and in which one or more surgical instruments are used to perform the surgical procedure on the patient.

As used herein, a surgical procedure may include any medical procedure, including any diagnostic or treatment procedure in which manual and/or instrumental techniques are used on a patient to investigate or treat a physical condition of the patient. A surgical procedure may refer to any phases of a medical procedure, such as preoperative, operative (i.e., intraoperative), and postoperative phases of a surgical procedure.

Imaging modalities 602 may be configured and/or used to capture imaging data 604 representative of surgical space 606. Such a capture is represented by dashed lines 610 in FIG. 6. Imaging modalities 602 may each capture imaging data 604 of surgical space 606 in any suitable manner and imaging data 604 may take any suitable form. For instance, imaging data 604 may be implemented as data representative of a still frame image (e.g., a grayscale image, a color image, an infrared image, etc.), a video (e.g., grayscale, color, infrared video, etc.), a 3D model, a depth map, a graphical element, or any other type of visual representation or depiction as may be useful for helping a user visualize surgical space 606 in a certain implementation. Imaging modalities 602 may also each capture imaging data 604 at any suitable time. For instance, one or more imaging modalities 602 may capture imaging data 604 of surgical space 606 during one or more preoperative, intraoperative, and/or postoperative phases of a surgical procedure.

Endoscopic imaging modality 602-1 is a modality that involves imaging data captured by way of an endoscope (e.g., or another suitable type of endoscopic instrument) that is configured to project light (e.g., light at visible frequencies) onto anatomy in surgical space 606, and to capture photographic imagery of the anatomy as the light reflects from the anatomy to one or more image sensors associated with the endoscope. In contrast, additional imaging modality 602-2 may be a different type of imaging modality (i.e., a modality other than an endoscopic imaging modality) in certain examples. For example, as described above, additional imaging modality 602-2 may include or involve, without limitation, ultrasound imaging by an ultrasound module or machine, CT imaging by a CT machine, MRI imaging by an MRI machine, or the like. Any other suitable additional imaging modalities may be used in other examples.

In certain examples, endoscopic imaging modality 602-1 may be configured to capture imagery of surface anatomy included in surgical space 606 (e.g., an outer surface of tissue included in the surgical space), and additional imaging modality 602-2 may be configured to capture imagery of subsurface anatomy included in surgical space 606 (e.g., subsurface tissue that is behind the outer surface of tissue included in the surgical space). For example, endoscopic imaging modality 602-1 may capture images of surface tissue within a patient, and additional imaging modality 602-1 may include ultrasound, CT, or MRI imaging that captures images of subsurface tissue that, from the perspective of the endoscope, is behind and hidden from the view of the endoscope by the surface anatomy.

As mentioned above, imaging modalities 602 may each capture imaging data 604 of surgical scene 606 at any suitable time, such as during any phase(s) of a surgical procedure or operation. In certain examples, imaging modalities 602 may concurrently capture imaging data 604 of surgical space 606. For instance, endoscopic imaging modality 602-1 may capture endoscopic imagery during a surgical procedure (e.g., during an operative phase of the surgical procedure), and additional imaging modality 602-1 may concurrently capture another type of imagery during the surgical procedure. In other examples, imaging modalities 602 may capture imaging data 604 of surgical space 606 at different times and/or during different phases of the surgical procedure. For instance, endoscopic imaging modality 602-1 may capture endoscopic imagery during an operative phase of the surgical procedure, and additional imaging modality 602-2 may capture another type of imagery during a preoperative phase of the surgical procedure.

Imaging data 604 representative of surgical space 606 may include images captured of surgical space 606 by imaging modalities 602. For example, imaging data 604 may include endoscopic images, ultrasound images, CT images, MRI images, and/or any other suitable form of images of surgical space 606. Additionally or alternatively, imaging data 604 may include one or more models of surgical space 606 that are generated based on imaging performed by an imaging modality. For example, additional imaging data 604-2 may include a 3D model of surgical space 606 that is generated based on imaging performed by an imaging modality, such as imaging performed by an ultrasound machine, a CT machine, an MRI machine, or another suitable imaging modality. The 3D model may be a full volumetric model that includes voxels (i.e., volumetric pixels) having values (e.g., color values, brightness values, etc.) representative of an appearance of surgical space 606 at 3D points within the model. Such a volumetric model may facilitate any slice of the 3D model being identified and used by system 100 to produce an image of the slice of the 3D model.

While FIG. 6 depicts two imaging modalities 602-1 and 602-2 respectively capturing imaging data 604-1 and 604-2 provided as input to system 100, other examples may include any suitable number and/or configuration of multiple, different imaging modalities that capture imagery that is provided as input to system 100 for use in generating composite imagery of surgical space 606. For example, three or more different imaging modalities may capture imagery that is input to system 100 for use in generating composite imagery of surgical space 606.

System 100 may generate composite imagery 612 (e.g., including one or more composite images 612) of surgical space 606 based on imaging data 604 captured by imaging modalities 602. System 100 may do this in any suitable way to generate a composite image that includes integrated representations of portions of surgical space 606 as captured by different imaging modalities 602.

System 100 may direct a display device 614 to display composite imagery 612. For example, system 100 may provide data representative of composite imagery 612 to display device 614, which may be configured to display composite imagery 612 for viewing by a user of a computer-assisted surgical system (e.g., a surgeon or other surgical team member performing the surgical procedure). Display device 614 may include any device capable of receiving and processing imaging data to display one or more images. To this end, display device 614 may include one or more display screens on which images may be displayed. In certain examples, display device 614 may be a component of or communicatively connected to a computer-assisted surgical system such as will be described in more detail below.

As has been mentioned, system 100 may be implemented in or communicatively coupled to a computer-assisted surgical system. System 100 may receive input from and provide output to the computer-assisted surgical system. For example, system 100 may access imagery of a surgical space and/or any information about the surgical space and/or the computer-assisted surgical system from the computer-assisted surgical system, use the accessed imagery and/or information to perform any of the processing described herein to generate composite imagery of the surgical space, and provide data representative of the composite imagery to the computer-assisted surgical system for display (e.g., by a display device associated with the computer-assisted surgical system).

Figure 7:
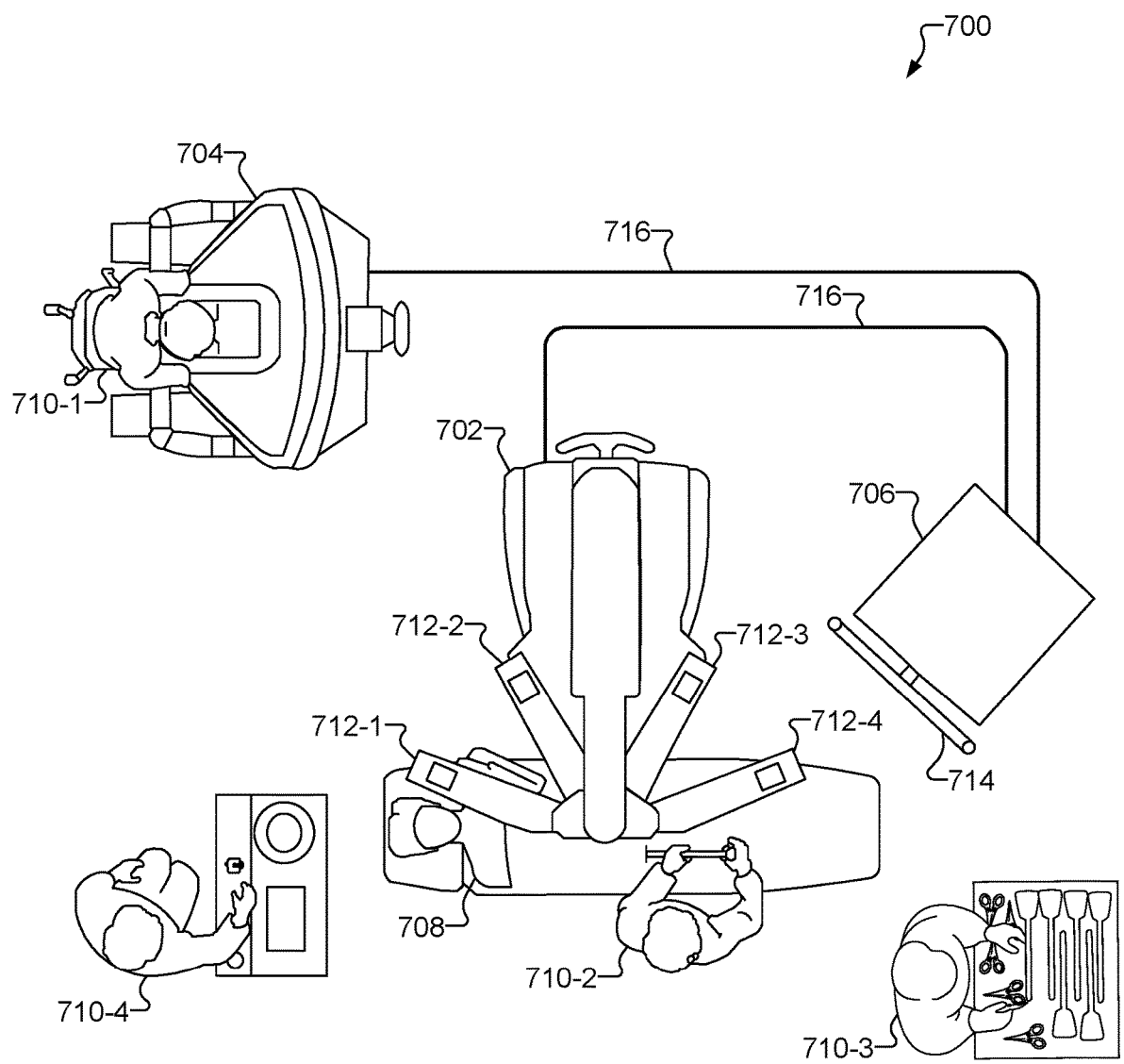
FIG. 7 illustrates an exemplary computer-assisted surgical system according to principles described herein.

To illustrate, FIG. 7 shows an exemplary computer-assisted surgical system 700 ("surgical system 700"). System 100 may be implemented by surgical system 700, connected to surgical system 700, and/or otherwise used in conjunction with surgical system 700.

As shown, surgical system 700 may include a manipulating system 702, a user control system 704, and an auxiliary system 706 communicatively coupled one to another. Surgical system 700 may be utilized by a surgical team to perform a computer-assisted surgical procedure on a patient 708. As shown, the surgical team may include a surgeon 710-1, an assistant 710-2, a nurse 710-3, and an anesthesiologist 710-4, all of whom may be collectively referred to as "surgical team members 710." Additional or alternative surgical team members may be present during a surgical session as may serve a particular implementation.

While FIG. 7 illustrates an ongoing minimally invasive surgical procedure, it will be understood that surgical system 700 may similarly be used to perform open surgical procedures or other types of surgical procedures that may similarly benefit from the accuracy and convenience of surgical system 700. Additionally, it will be understood that the surgical session throughout which surgical system 700 may be employed may not only include an operative phase of a surgical procedure, as is illustrated in FIG. 7, but may also include preoperative, postoperative, and/or other suitable phases of the surgical procedure.

As shown in FIG. 7, manipulating system 702 may include a plurality of manipulator arms 712 (e.g., manipulator arms 712-1 through 712-4) to which a plurality of surgical instruments (e.g., such as surgical instruments 406, shown above) may be coupled. Each surgical instrument may be implemented by any suitable therapeutic instrument (e.g., a tool having tissue-interaction functions), imaging device (e.g., an endoscope), diagnostic instrument, or the like that may be used for a computer-assisted surgical procedure on patient 708 (e.g., by being at least partially inserted into patient 708 and manipulated to perform a computer-assisted surgical procedure on patient 708). In some examples, one or more of the surgical instruments may include force-sensing and/or other sensing capabilities. While manipulating system 702 is depicted and described herein as including four manipulator arms 712, it will be recognized that manipulating system 702 may include only a single manipulator arm 712 or any other number of manipulator arms as may serve a particular implementation. While manipulating system 702 is depicted and described herein as including four manipulator arms 712, it will be recognized that manipulating system 702 may include only a single manipulator arm 712 or any other number of manipulator arms as may serve a particular implementation.

Manipulator arms 712 and/or surgical instruments attached to manipulator arms 712 may include one or more displacement transducers, orientational sensors, and/or positional sensors used to generate raw (i.e., uncorrected) kinematics information. One or more components of surgical system 700 may be configured to use the kinematics information to track (e.g., determine positions of) and/or control the surgical instruments (as well as anything connected to the instruments such as an ultrasound module).

User control system 704 may be configured to facilitate control by surgeon 710-1 of manipulator arms 712 and surgical instruments attached to manipulator arms 712. For example, surgeon 710-1 may interact with user control system 704 to remotely move or manipulate manipulator arms 712 and the surgical instruments. To this end, user control system 704 may provide surgeon 710-1 with imagery of a surgical space associated with patient 708 as captured by an imaging system (e.g., any of the medical imaging systems described herein). In certain examples, user control system 704 may include a stereo viewer having two displays where stereoscopic images of a surgical space associated with patient 708 and generated by a stereoscopic imaging system may be viewed by surgeon 710-1. In certain examples, composite imagery generated by system 70 may be displayed by user control system 704. Surgeon 710-1 may utilize the imagery displayed by user control system 704 to perform one or more procedures with one or more surgical instruments attached to manipulator arms 712.

To facilitate control of surgical instruments, user control system 704 may include a set of master controls. These master controls may be manipulated by surgeon 710-1 to control movement of surgical instruments (e.g., by utilizing robotic and/or teleoperation technology). The master controls may be configured to detect a wide variety of hand, wrist, and finger movements by surgeon 710-1. In this manner, surgeon 710-1 may intuitively perform a procedure using one or more surgical instruments.

Auxiliary system 706 may include one or more computing devices configured to perform primary processing operations of surgical system 700. In such configurations, the one or more computing devices included in auxiliary system 706 may control and/or coordinate operations performed by various other components (e.g., manipulating system 702 and user control system 704) of surgical system 700. For example, a computing device included in user control system 704 may transmit instructions to manipulating system 702 by way of the one or more computing devices included in auxiliary system 706. As another example, auxiliary system 706 may receive (e.g., from manipulating system 702) and may process image data representative of imagery captured by an imaging device attached to one of manipulator arms 712.

In some examples, auxiliary system 706 may be configured to present visual content to surgical team members 710 who may not have access to the images provided to surgeon 710-1 at user control system 704. To this end, auxiliary system 706 may include a display monitor 714 configured to display one or more user interfaces, such as images (e.g., 2D images, 3D images, composite images, etc.) of the surgical space, information associated with patient 708 and/or the surgical procedure, and/or any other visual content as may serve a particular implementation. For example, display monitor 714 may display images of the surgical space (e.g., composite images generated by system 100). In some embodiments, display monitor 714 is implemented by a touchscreen display with which surgical team members 710 may interact (e.g., by way of touch gestures) to provide user input to surgical system 700.

Manipulating system 702, user control system 704, and auxiliary system 706 may be communicatively coupled one to another in any suitable manner. For example, as shown in FIG. 7, manipulating system 702, user control system 704, and auxiliary system 706 may be communicatively coupled by way of control lines 716, which may represent any wired or wireless communication link as may serve a particular implementation. To this end, manipulating system 702, user control system 704, and auxiliary system 706 may each include one or more wired or wireless communication interfaces, such as one or more local area network interfaces, Wi-Fi network interfaces, cellular interfaces, etc.

Figure 8:
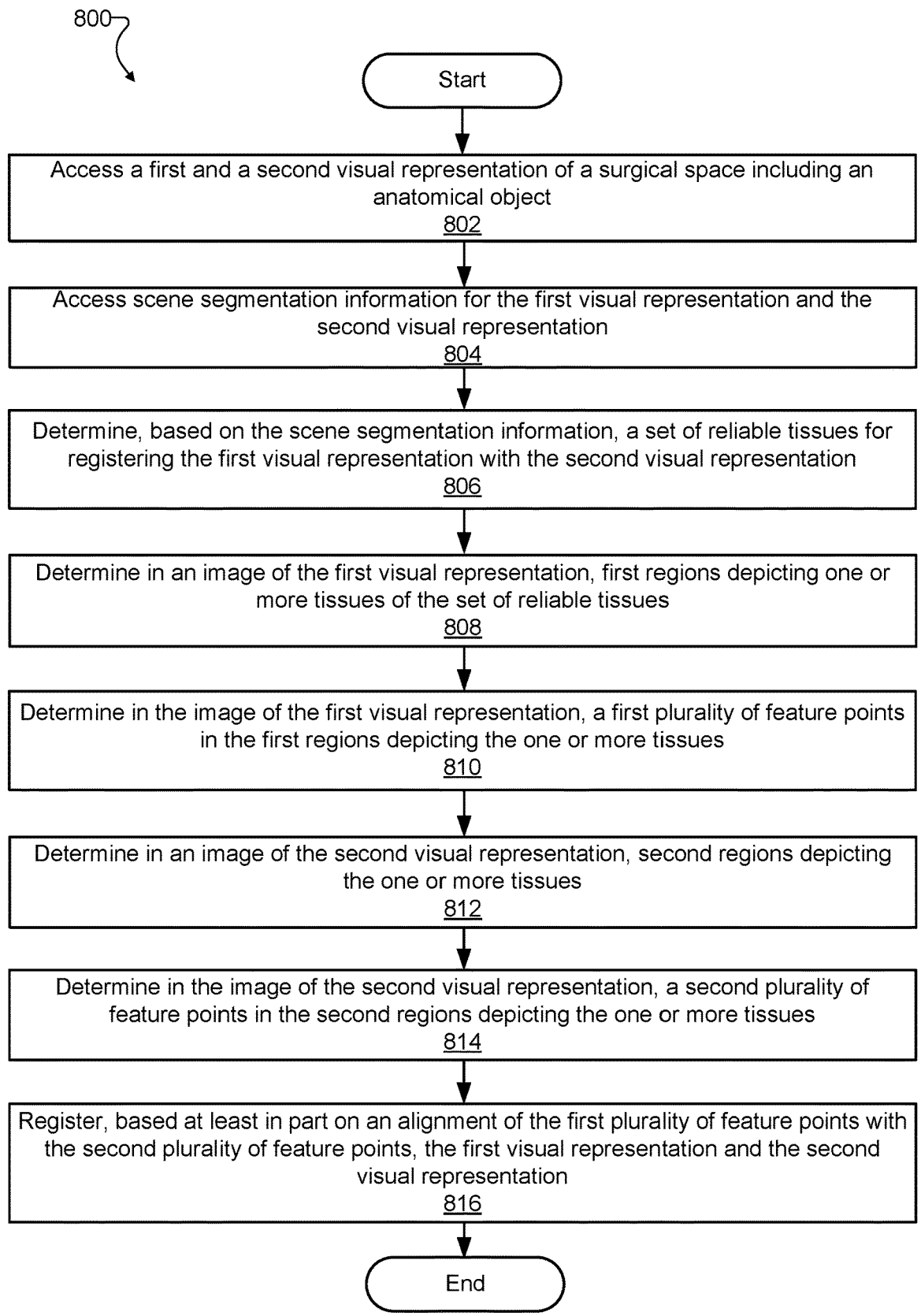
FIGS. 8-10 illustrate exemplary methods for tracking anatomical objects in video according to principles described herein.

FIG. 8 illustrates an exemplary method 800 for registering datasets of visual representations of a surgical space. While FIG. 8 illustrates exemplary operations according to one embodiment, other embodiments may omit, add to, reorder, combine, and/or modify any of the operations shown in FIG. 8. One or more of the operations shown in in FIG. 8 may be performed by an image management system such as system 100, any components included therein, and/or any implementation thereof.

In operation 802, an image management system may access a first and a second visual representation (e.g., datasets of the first and second visual representations) of a surgical space including an anatomical object. Operation 802 may be performed in any of the ways described herein.

In operation 804, the image management system may access scene segmentation information for the first visual representation and the second visual representation. Operation 804 may be performed in any of the ways described herein.

In operation 806, the image management system may determine, based on the scene segmentation information, a set of reliable tissues for registering datasets of the first visual representation with the second visual representation. Operation 806 may be performed in any of the ways described herein.

In operation 808, the image management system may determine in an image of the first visual representation, first regions depicting one or more tissues of the set of reliable tissues. Operation 808 may be performed in any of the ways described herein.

In operation 810, the image management system may determine in the image of the first visual representation, a first plurality of feature points in the first regions depicting the one or more tissues. Operation 810 may be performed in any of the ways described herein.

In operation 812, the image management system may determine in an image of the second visual representation, second regions depicting the one or more tissues. Operation 812 may be performed in any of the ways described herein.

In operation 814, the image management system may determine in the image of the second visual representation, a second plurality of feature points in the second regions depicting the one or more tissues. Operation 814 may be performed in any of the ways described herein.

In operation 816, the image management system may register, based at least in part on an alignment of the first plurality of feature points with the second plurality of feature points, datasets of the first visual representation and the second visual representation. Operation 816 may be performed in any of the ways described herein.

Figure 9:
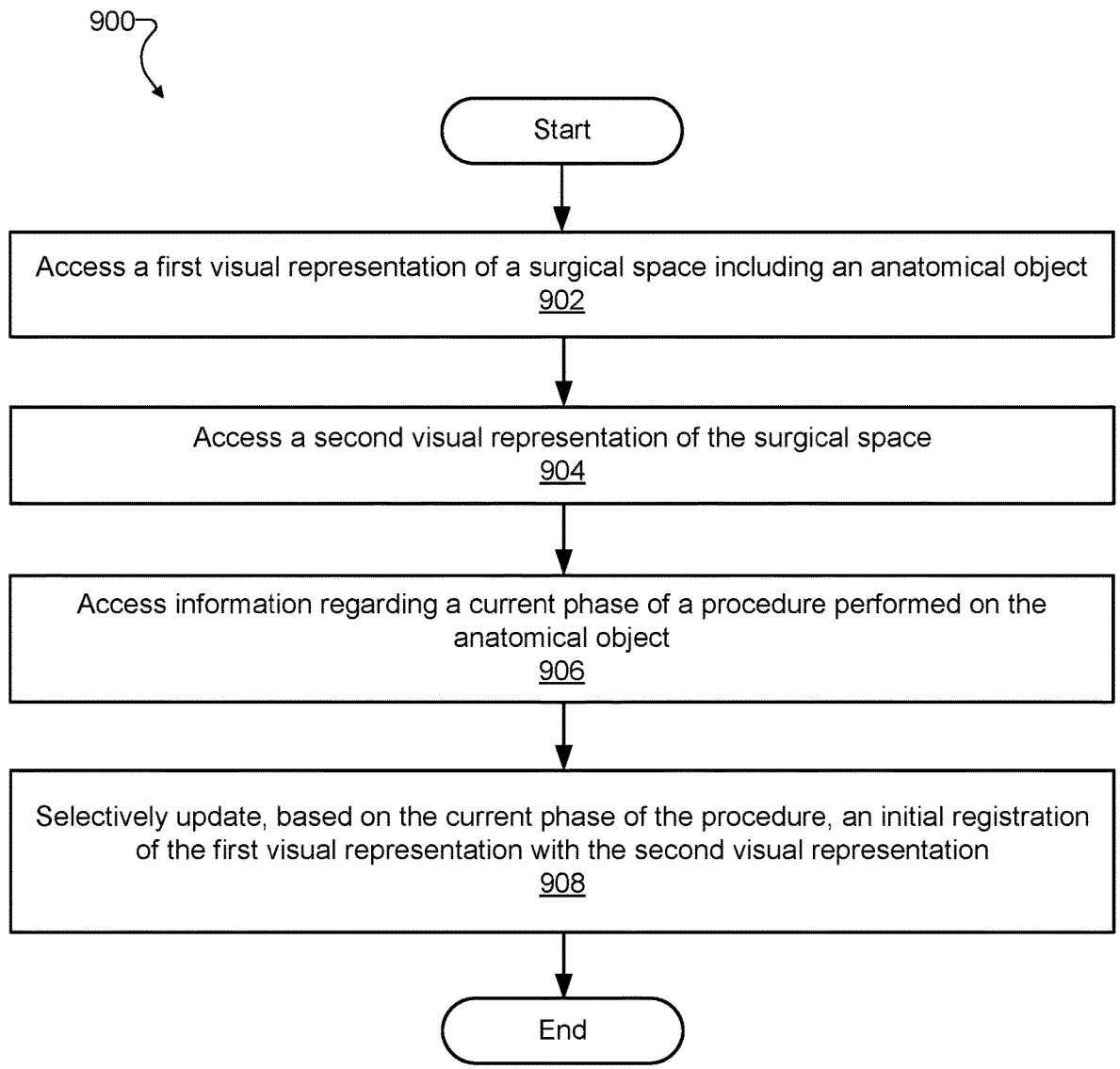

FIG. 9 illustrates another exemplary method, a method 900, for registering datasets of visual representations of a surgical space. While FIG. 9 illustrates exemplary operations according to one embodiment, other embodiments may omit, add to, reorder, combine, and/or modify any of the operations shown in FIG. 9. One or more of the operations shown in in FIG. 9 may be performed by an image management system such as system 100, any components included therein, and/or any implementation thereof.

In operation 902, an image management system may access a first visual representation (e.g., a first dataset of the first visual representation) of a surgical space including an anatomical object. Operation 902 may be performed in any of the ways described herein.

In operation 904, the image management system may access a second visual representation (e.g., a second dataset of the second visual representation) of the surgical space. Operation 1204 may be performed in any of the ways described herein.

In operation 906, the image management system may access information regarding a current phase of a procedure performed on the anatomical object. Operation 906 may be performed in any of the ways described herein.

In operation 908, the image management system may selectively update, based on the current phase of the procedure, an initial registration of a dataset of the first visual representation with a dataset of the second visual representation. Operation 908 may be performed in any of the ways described herein.

Figure 10:
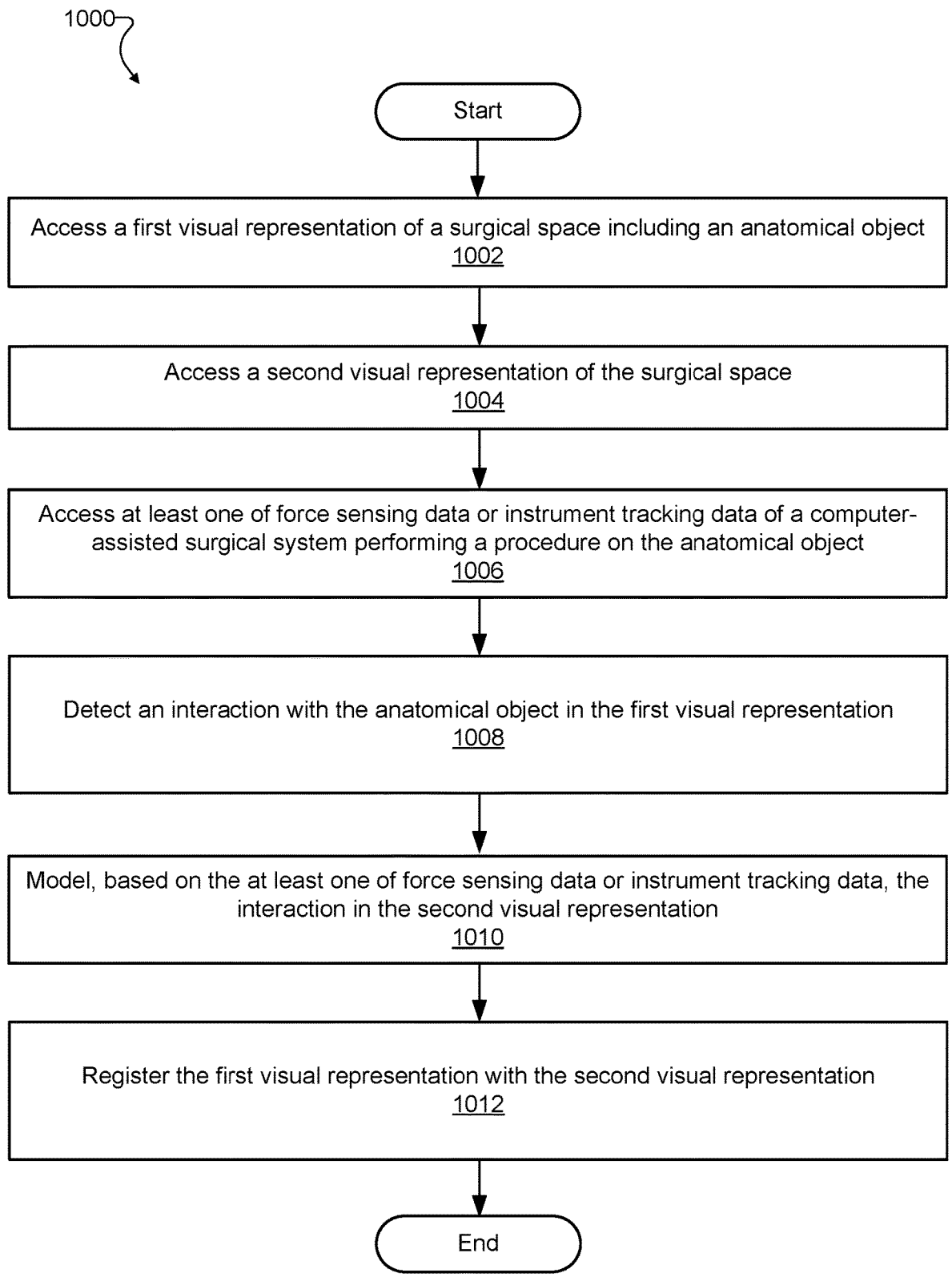

FIG. 10 illustrates another exemplary method, a method 1000, for registering datasets of visual representations of a surgical space. While FIG. 10 illustrates exemplary operations according to one embodiment, other embodiments may omit, add to, reorder, combine, and/or modify any of the operations shown in FIG. 10. One or more of the operations shown in in FIG. 10 may be performed by an image management system such as system 100, any components included therein, and/or any implementation thereof.

In operation 1002, an image management system may access a first visual representation (e.g., a first dataset of the first visual representation) of a surgical space including an anatomical object. Operation 1002 may be performed in any of the ways described herein.

In operation 1004, the image management system may access a second visual representation (e.g., a second dataset of the second visual representation) of the surgical space. Operation 1004 may be performed in any of the ways described herein.

In operation 1006, the image management system may access force sensing data of a computer-assisted surgical system performing a procedure on the anatomical object. Operation 1006 may be performed in any of the ways described herein.

In operation 1008, the image management system may detect an interaction with the anatomical object in a dataset of the first visual representation. Operation 1008 may be performed in any of the ways described herein.

In operation 1010, the image management system may model, based on the force sensing data, the interaction in a dataset of the second visual representation. Operation 1010 may be performed in any of the ways described herein.

In operation 1012, the image management system may register a dataset of the first visual representation with a dataset of the second visual representation. Operation 1012 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
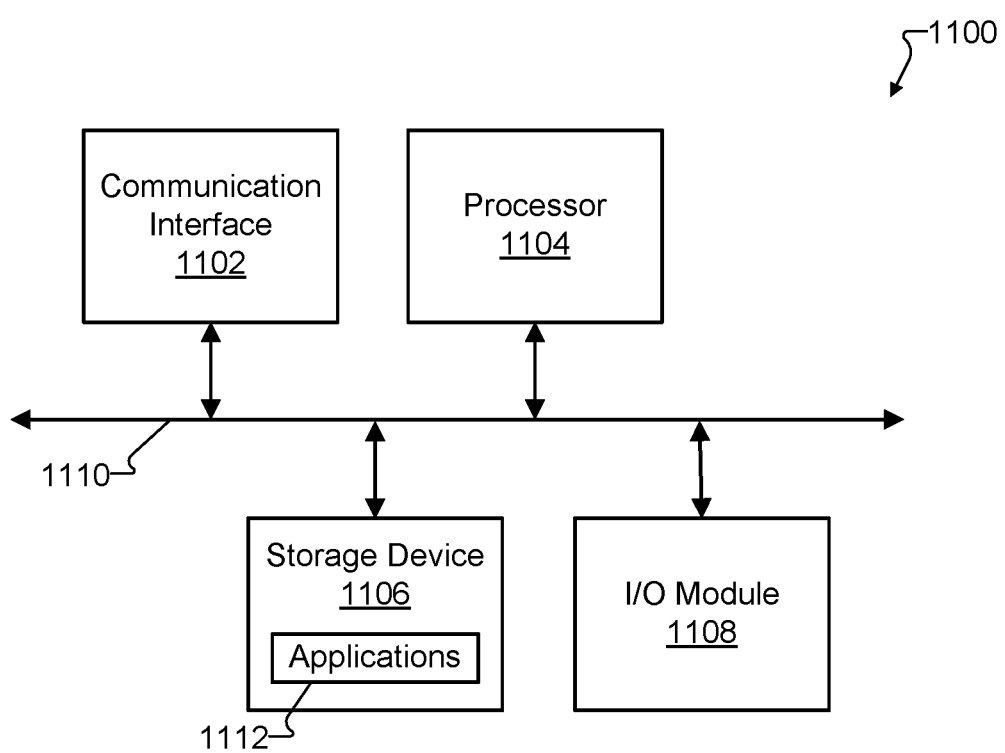
FIG. 11 illustrates an exemplary computing device according to principles described herein.

FIG. 11 illustrates an exemplary computing device 1100 that may be specifically configured to perform one or more of the processes described herein. Any of the systems, units, computing devices, and/or other components described herein may be implemented by computing device 1100.

As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct an implementation of processor 1104 to perform one or more operations or functions associated with processing facility 104 of system 100. Likewise, storage facility 102 of system 100 may be implemented by or within an implementation of storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a memory storing instructions;
   a processor communicatively coupled to the memory and configured to execute the instructions to:
   access semantic information regarding an anatomical object in a surgical scene, wherein the semantic information includes scene segmentation information for an image of the surgical scene and for a model of the anatomical object; and
   register, based at least in part on the semantic information regarding the anatomical object, the image of the surgical scene with the model of the anatomical object, wherein the registering, based at least in part on the semantic information, the image of the surgical scene with the model of the anatomical object includes:
   determining, based on the scene segmentation information, a reliability of a set of tissues in the surgical scene; and
   registering, based at least in part on the reliability of the set of tissues, the image of the surgical scene and the model of the anatomical object.

2. The system of claim 1, wherein the registering, based at least in part on the semantic information, the image of the surgical scene with the model of the anatomical object includes:
   determining, based on the scene segmentation information, a set of reliable tissues for registering the image of the surgical scene with the model of the anatomical object;
   determining, in the image of the surgical scene, first regions depicting one or more tissues of the set of reliable tissues;
   determining, in the image of the surgical scene, a first plurality of feature points in the first regions depicting the one or more tissues;
   determining, in an image of the model of the anatomical object, second regions depicting the one or more tissues;
   determining, in the image of the model of the anatomical object, a second plurality of feature points in the second regions depicting the one or more tissues; and
   registering, based at least in part on an alignment of the first plurality of feature points with the second plurality of feature points, the image of the surgical scene and the model of the anatomical object.

3. The system of claim 2, wherein the determining the set of reliable tissues includes selecting at least one tissue from the scene segmentation information based on at least one characteristic of the selected at least one tissue.

4. The system of claim 3, wherein the at least one characteristic of the selected at least one tissue includes at least one of a hardness of the tissue, a rigidity of the tissue, a mobility of the tissue, or a typical amount of movement of the tissue during a procedure on the anatomical object.

5. The system of claim 2, wherein the determining the set of reliable tissues includes selecting at least one tissue from the scene segmentation information and comparing the selected at least one tissue to a predefined list.

6. The system of claim 5, wherein the predefined list includes bone, vasculature, and the anatomical object.

7. The system of claim 1, wherein the registering, based at least in part on the semantic information, the image of the surgical scene with the model of the anatomical object includes:
   determining, based on the scene segmentation information, a set of unreliable tissues for registering the image of the surgical scene with the model of the anatomical object;
   determining, in the image of the surgical scene, first regions depicting one or more tissues of the set of unreliable tissues;
   determining, in the image of the surgical scene, a first plurality of feature points in regions of the image of the surgical scene other than the first regions;
   determining, in an image of the model of the anatomical object, second regions depicting the one or more tissues;
   determining, in the image of the model of the anatomical object, a second plurality of feature points in regions of the image of the model of the anatomical object other than the second regions; and
   registering, based at least in part on an alignment of the first plurality of feature points with the second plurality of feature points, the image of the surgical scene and the model of the anatomical object.

8. The system of claim 1, wherein the registering, based at least in part on the semantic information, the image of the surgical scene with the model of the anatomical object includes:
   determining, based on the scene segmentation information, a first set of the set of tissues and a second set of the set of tissues, the first and second sets determined based on the reliability of the tissues for registering the image of the surgical scene with the model of the anatomical object;
   determining, in the image of the surgical scene, first regions depicting one or more tissues of the first set of tissues;

determining, in the image of the surgical scene, second regions depicting one or more tissues of the second set of tissues;

determining, in the image of the surgical scene, a first plurality of feature points in the first regions;

determining, in the image of the surgical scene, a second plurality of feature points in the second regions;

determining, in an image of the model of the anatomical object, third regions depicting one or more tissues of the first set of tissues;

determining, in the image of the model of the anatomical object, fourth regions depicting one or more tissues of the second set of tissues;

determining, in the image of the model of the anatomical object, a third plurality of feature points in the third regions;

determining, in the image of the model of the anatomical object, a fourth plurality of feature points in the fourth regions;

registering, based at least in part on a weighted alignment of the first plurality of feature points with the third plurality of feature points and the second plurality of feature points with the fourth plurality of feature points, the image of the surgical scene and the model of the anatomical object.

9. The system of claim 1, wherein the registering, based at least in part on the semantic information, the image of the surgical scene with the model of the anatomical object includes:

determining, based on the scene segmentation information, in the image of the surgical scene, a first boundary between a first tissue and a second tissue;

determining, based on the scene segmentation information, in an image of the model of the anatomical object, a second boundary between the first tissue and the second tissue; and registering, based at least in part on an alignment of the first boundary and the second boundary, the image of the surgical scene and the model of the anatomical object.

10. The system of claim 1, wherein the semantic information includes a current phase of a procedure performed on the anatomical object.

11. The system of claim 10, wherein the registering, based at least in part on the semantic information, the image of the surgical scene with the model of the anatomical object includes selectively updating, based on the current phase of the procedure, an initial registration of the image of the surgical scene with the model of the anatomical object.

12. The system of claim 10, wherein the registering, based at least in part on the semantic information, the image of the surgical scene with the model of the anatomical object includes:

determining a set of procedure phases in which the anatomical object moves more than a threshold amount; and selectively refraining, when the current phase of the procedure is one of the set of procedure phases, from registering the image of the surgical scene with the model of the anatomical object.

13. The system of claim 1, wherein the semantic information includes force sensing data of a computer-assisted surgical system performing a procedure on the anatomical object.

14. The system of claim 13, wherein the registering, based at least in part on the semantic information, the image of the surgical scene with the model of the anatomical object includes:

detecting, based on the force sensing data, an interaction with the anatomical object in the image of the surgical scene; and modeling the interaction in the model of the anatomical object.

15. The system of claim 1, wherein the model of the anatomical object includes one of:

an ultrasound scan of the anatomical object or a surgical space;

a computerized tomography ("CT") scan of the anatomical object or the surgical space;

a magnetic resonance imaging ("MRI") scan of the anatomical object or the surgical space; or a fluoroscopic imaging scan of the anatomical object or the surgical space.

16. The system of claim 1, wherein the model of the anatomical object includes at least one of a virtual object or an annotation.

17. A method comprising:

accessing, by a processor, scene segmentation information for an image of a surgical scene of a surgical space including an anatomical object and a model of the anatomical object;

determining, by the processor, based on the scene segmentation information, a set of reliable tissues for registering a data set of the image of a surgical scene with the model of the anatomical object;

determining, by the processor, in the image of the surgical scene, first regions depicting one or more tissues of the set of reliable tissues;

determining, by the processor, in the image of the surgical scene, a first plurality of feature points in the first regions depicting the one or more tissues;

determining, by the processor, in an image of the model of the anatomical object, second regions depicting the one or more tissues;

determining, by the processor, in the image of the model of the anatomical object, a second plurality of feature points in the second regions depicting the one or more tissues; and registering, by the processor, based at least in part on an alignment of the first plurality of feature points with the second plurality of feature points, the image of the surgical scene and the model of the anatomical object.

18. The method of claim 17, wherein the determining the set of reliable tissues includes selecting at least one tissue from the scene segmentation information based on at least one characteristic of the selected at least one tissue.

19. A non-transitory computer-readable medium storing instructions that, when executed, direct at least one processor of a computing device to:

access semantic information regarding an anatomical object in a surgical scene, wherein the semantic information includes scene segmentation information for an image of the surgical scene and for a model of the anatomical object; and register, based at least in part on the semantic information regarding the anatomical object, the image of the surgical scene with the model of the anatomical object, wherein the registering, based at least in part on the semantic information, the image of the surgical scene with the model of the anatomical object includes:

determining, based on the scene segmentation information, a reliability of a set of tissues in the surgical scene; and registering, based at least in part on the reliability of the set of tissues, the image of the surgical scene and the model of the anatomical object.

20. The computer-readable medium of claim 19, wherein the registering, based at least in part on the semantic information, the image of the surgical scene with the model of the anatomical object includes:

determining, based on the scene segmentation information, a set of reliable tissues for registering the image of the surgical scene with the model of the anatomical object;

determining, in the image of the surgical scene, first regions depicting one or more tissues of the set of reliable tissues;

determining, in the image of the surgical scene, a first plurality of feature points in the first regions depicting the one or more tissues;

determining, in an image of the model of the anatomical object, second regions depicting the one or more tissues;

determining, in the image of the model of the anatomical object, a second plurality of feature points in the second regions depicting the one or more tissues; and registering, based at least in part on an alignment of the first plurality of feature points with the second plurality of feature points, the image of the surgical scene and the model of the anatomical object.

* * * * *